United States Patent
Gelbin

(12) 
(10) Patent No.: US 6,277,907 B1
(45) Date of Patent: Aug. 21, 2001

(54) THERMOPLASTIC RESINS STABILIZED BY BLENDS OF STERICALLY HINDERED PHENOLS, SECONDARY AMINES, AND THIOETHERS

(75) Inventor: Michael E. Gelbin, Middlebury, CT (US)

(73) Assignee: Uniroyal Chemical Company, Inc., Middlebury, CT (US)

(*) Notice: Subject to any disclaimer, the term of this patent is extended or adjusted under 35 U.S.C. 154(b) by 0 days.

(21) Appl. No.: 09/188,426

(22) Filed: Nov. 9, 1998

(51) Int. Cl.$^7$ ............................................. C08L 5/16
(52) U.S. Cl. ........................ 524/196; 524/492; 524/493; 524/789; 524/849
(58) Field of Search ........................ 524/196, 495, 524/493, 492, 789, 847, 849

(56) References Cited

U.S. PATENT DOCUMENTS

| | | |
|---|---|---|
| 1,906,935 | 5/1933 | Horst . |
| 1,975,167 | 10/1934 | Meuser . |
| 2,002,642 | 5/1935 | Meuser et al. . |
| 2,387,518 | 10/1945 | Lightbrown et al. . |
| 2,562,802 | 7/1951 | Mankowich et al. . |
| 2,765,292 | 10/1956 | Groff et al. . |
| 2,789,962 | 4/1957 | Groff et al. . |
| 2,965,606 | 12/1960 | Ford et al. . |
| 3,001,969 | 9/1961 | Tholstrup et al. . |
| 3,249,583 | 5/1966 | Tholstrup . |
| 3,318,841 | 5/1967 | Tomlinson et al. . |
| 3,322,802 | 5/1967 | Brooks et al. . |
| 3,452,056 | 6/1969 | Sundbolm . |
| 3,477,972 | 11/1969 | Kamio et al. . |
| 3,496,128 | 2/1970 | Casey et al. . |
| 3,505,225 | 4/1970 | Wheeler ........................... 252/33.6 |
| 3,531,434 | 9/1970 | Isaac . |
| 3,535,249 | 10/1970 | Larson . |
| 3,535,300 | 10/1970 | Gable . |
| 3,700,750 | 10/1972 | Yamanouchi et al. . |
| 3,907,743 | 9/1975 | Goto et al. . |
| 4,797,511 | 1/1989 | Capolupo et al. ................... 174/110 |
| 4,837,259 | 6/1989 | Chucta ............................. 524/258 |
| 4,994,511 | 2/1991 | Kluttz ............................. 524/202 |
| 5,646,207 | 7/1997 | Schell ............................. 524/47 |

FOREIGN PATENT DOCUMENTS

| | | |
|---|---|---|
| 0 328 788 | 2/1988 | (EP) . |
| 309285A2 | 3/1989 | (EP) . |
| 1356107 | 6/1974 | (GB) . |
| 2-265939 | 6/1989 | (JP) . |
| 95/25074 | 9/1995 | (WO) . |

OTHER PUBLICATIONS

The Abstract of Hwahak Kwa Hwahak Kongop (1975), 18(6).

Gachter/Muller: Plastics Additives Handbook, Hanser Publishers, 4th edition.

Hawkins, W.L. in Polymer Degradation and Stabilization, Springer–Verlag, New York (1984), especially p. 56.

Lim, Yong Ho, Effects of some Antioxidants on the Stability of Chloroprene Rubber, Hwahak Kwa Hwahak Kongop (1975), 19(6), 302–9.

Primary Examiner—Peter D. Mulcahy
(74) Attorney, Agent, or Firm—Raymond D. Thompson; Paul Grandinetti

(57) ABSTRACT

A method is disclosed for stabilizing a thermoplastic resin, which may also contain carbon black and/or glass, wherein the method comprises adding to the resin a stabilizing amount of at least one sterically hindered phenol antioxidant, at least one secondary amine antioxidant and/or at least one N,N'-substituted oxamide antioxidant, and at least one thioether antioxidant.

22 Claims, No Drawings

THERMOPLASTIC RESINS STABILIZED BY BLENDS OF STERICALLY HINDERED PHENOLS, SECONDARY AMINES, AND THIOETHERS

BACKGROUND OF THE INVENTION

1. Field of the Invention

The present invention relates to the oxidative stabilization of thermoplastic resins, particularly polyolefin-based thermoplastic resins.

2. Description of Related Art

Manufacturers of plastic goods have experienced a long-standing problem in stabilizing plastic resins during the high temperature, high shear, blending, and extrusion processes that are common in the industry. Resins that show excellent long-term heat stability characteristics may not be sufficiently protected against the type of degradation that occurs in an extruder during long residence times or in glass mat reinforced thermoplastic (GMT) applications where the plastic is exposed to high temperature heat fusion followed by compression molding.

GMT is a rapidly growing area in automotive under-the-hood applications. Owing to very tough processing conditions in the manufacture of GMT, the specifications for stabilizing the thermoplastic resin, as set by GMT producers, are extraordinarily high. For example, a GMT test specimen incorporating a viable antioxidant candidate must pass a long-term heat aging test for one thousand hours at 150° C. In a second test, a GMT test specimen must show less than two percent weight loss after exposure at 230° C. for 15 minutes. Commercially available antioxidants are capable of providing this type of stabilizing effect, if at all, only at load levels that are so high as to be economically infeasible. Thus, there is a continuing need to develop novel antioxidants, or blends thereof, that can provide the required stabilization at load levels that are lower than those currently known.

European Patent Publication Number 0 080 409 discloses rubber compounds that are useful in molding bags that resist oils at 140°/skbar and contain epichlorohydrin polymers (100 parts), plasticizers (0.5 to 20 parts), reinforcing fillers (1 to 150 parts), metal stearates (0.5 to 7.5 parts), $Pb_3O_4$ (0.5 to 7.5 parts), stabilizers (0.5 to 5.5 parts), and vulcanizing agents (0.5 to 5.5 parts). Thus, a mixture of 100 parts polyepichlorohydrin, 4 parts stearic acid, 2.5 parts $Pb_3O_4$, 1 part zinc stearate, 2.5 parts N-isopropyl-N'-phenyl-p-phenylenediamine, 1 part $(Bu_2NCS_2)_2Ni$, 0.75 part $H_2N(CH_2)_6COOH$, and 30 parts carbon black was vulcanized 40 minutes at 160° to give a rubber having a tensile strength of 18.7 MPa, elongation 900 percent, 300 percent modulus 6 MPa, and Shore hardness 61; compared with 16.3, 720, 7.6, and 64, respectively, after 24 hours in air at 140°; and 14.3, 500, 9, and 60, respectively, after 24 hours in oil at 140°.

U.S. Pat. No. 4,797,511 discloses a composition stabilized against oxidative degradation comprising: a polyolefin, carbon black homogeneously incorporated in said polyolefin, a stabilizing amount of thiodiethylene bis(3,5-di-t-butyl-4-hydroxy)hydrocinnamate (Naugard 35 or EL50) first stabilizer component incorporated into said polyolefin and a second stabilizer component of at least one amine antioxidant selected from the group consisting of a para-substituted aralkyl-substituted diphenylamine; a para-phenylenediamine and a polymerized dihydroquinoline incorporated into said polyolefin.

U.S. Pat. No. 4,837,259 discloses polypropylene stabilized against oxidative degradation by the presence therein of a stabilizing amount of an antioxidant composition that comprises:

(a) at least one aralkyl-substituted diarylamine; and
(b) at least one sterically hindered phenol.

The stabilizing effect of these blends was demonstrated by measurement of the retention of melt-flow rate and Hunter color value. However, while the patentees clearly demonstrated the stabilizing effect of the blends by measuring retention of melt-flow rate and color hold of stabilized resin, stabilization as evidenced by oven aging testing, the most critical test method used in the GMT industry, was not disclosed. The present inventors tested blends within the scope of this patent for oven aging stability and found that a polypropylene film stabilized with a given blend of a diarylamine and a sterically hindered phenol gave only 200 hours at 150° C., far short of the GMT requirement for 1,000 hours.

European Patent Publication Number 0 328 788 discloses a composition comprising 100 parts by weight (pbw) of an aromatic vinyl compound-conjugated diene block copolymer and 1.0 to 5.0 pbw of a mixture of two or more compounds chosen from a dithiocarbamate derivative, a triazine derivative and a polyphenol compound, an adhesive composition containing it, and a process for the preparation of said compositions by mixing the components in question.

JP 71037440 discloses the use of thiourea, Irganox RA-565, Soxinol PZ $\{(Me_2NCS_2)_2Zn\}$, Irganox RA-1093, and Soxinol M (2-mercaptobenzothiazole) as discoloration stabilizers for polypropylene fibers and films containing a phenolic antioxidant. For example, a polypropylene textile containing 0.25 percent Irganox RA-1010 and impregnated with a 5 g/l thiourea solution (wet pickup 80 percent) was not discolored by ammonia, while an unfinished textile became pink.

Hwahak Kwa Hwahak Kongop (1975), 18(6), 302–9 discloses the use of tetraethylthiuram disulfide (I) and tetramethylthiuram disulfide (II) as heat stabilizers for S-modified neoprene rubber. The scorch time linearly increased with increasing I and II content, while Ni bis(N,N-dibutyl dithiocarbamate) (III), N-phenyl-2-naphthylamine (IV), thiophenylamine (V) and BHT accelerated the crosslinking. III, IV, and V were good antioxidants and prevented dehydrochlorination. The rubber containing 1 percent I had a storability (plasticity decrease by 70 percent) of 1.5 years.

WO 95/25074 discloses an aqueous chemical treatment or size for silaceous fibers and fillers that has a polyolefin compatible film-forming polymer, an organo-functional coupling agent, and at least one stabilizer to produce a polyolefin reinforcing article. The stabilizer is one or more of the following: alkali metal and alkaline earth metal and ammonium, phosphinates, phosphites, hypophosphites, sulfites and bisulfites, organic phosphinates and/or phosphites and mixtures thereof and in combination with other types of antioxidants like hindered phenols, diarylamines, thioethers, wherein the amount of stabilizer is in an effective stabilizing amount. Optionally the size can have one or more partial esters of a branched carboxylic acid copolymer present.

U.S. Pat. No. 5,646,207 discloses an aqueous sizing composition for glass fibers said to be particularly useful for the reinforcement of thermoplastic or thermosetting matrix polymers that contains a film-forming material, fluorescent whitening agent, coupling agent, stabilizing agent and lubricant. The film-forming material is selected to be compatible with thermosetting or thermoplastic matrix polymer used in the ultimate forming process. The fluorescent whitening agent is at least dispersed, emulsified or solubilized in water.

The sizing compositions are said to be particularly advantageous for sizing glass fibers to be used in the reinforcement of matrix polymers for forming molded parts. The resultant molded part exhibits exceptional whiteness and comparable physical properties to materials without the brightening agent.

Gächter/Müller: Plastics Additives Handbook, Hanser Publishers, 4$^{th}$ ed., describes the antioxidant activity of sterically hindered phenols, diarylamines, and thioethers, albeit not in the context of ternary blends. See especially pages 40, 41, 44–47, and 52–55. It is stated on page 54, "The most important long-term heat stabilizers for polypropylene are phenols of medium (300–600) and especially high (600 to 1200) molecular weight. They are frequency used together with thioethers as synergists, e.g. dilauryl thiodipropionate . . . , or distearyl thiodipropionate . . . , or dioctadecyl disulfide . . . ."

The disclosures of the foregoing are incorporated herein by reference in their entirety.

SUMMARY OF THE INVENTION

The present invention is characterized by a polymeric material that includes a stabilizing mixture comprising at least three components. The first component is a sterically hindered phenol, another component is a secondary amine and/or at least one N,N'-substituted oxamide, and still another component is a thioether.

More specifically, it has been found that the oven aging stabilizing ability of secondary amine/phenol blends, such as those described in U.S. Pat. No. 4,837,259, can be improved when an additional component, chosen from the class of thioethers, is included, thus giving a ternary or quaternary blend. For example, after adding distearylthiodipropionate, oven aging performance was typically improved from about 200 hours to about 1,000 hours, a fivefold increase.

More particularly, the present invention is directed to a composition comprising:

(A) a thermoplastic resin; and
(B) a stabilizing amount of a blend of at least one sterically hindered phenol antioxidant, at least one secondary amine antioxidant and/or at least one N,N'-substituted oxamide, and at least one thioether antioxidant.

In a preferred embodiment, the present invention is directed to a composition comprising:

(A) a thermoplastic resin;
(B) up to about 10 percent by weight carbon black;
(C) up to about 50 percent by weight glass; and
(D) a stabilizing amount of:
  (1) a first stabilizer comprising at least one N,N'-substituted oxamide and/or at least one secondary amine antioxidant selected from the group consisting of:
    (i) a hydrocarbon-substituted diarylamine,
    (ii) a reaction product of a diarylamine and an aliphatic ketone,
    (iii) an N,N'-hydrocarbon substituted para-phenylenediamine, and
    (iv) a polymerized dihydroquinoline;
  (2) a second stabilizer comprising at least one sterically hindered phenol antioxidant; and
  (3) a third stabilizer comprising at least one thioether antioxidant.

In another aspect, the present invention is directed to a method for stabilizing a composition comprising a thermoplastic resin comprising adding thereto a stabilizing amount of at least one sterically hindered phenol antioxidant, at least one secondary amine antioxidant and/or at least one N,N'-substituted oxamide antioxidant, and at least one thioether antioxidant.

In a preferred embodiment of this aspect, the present invention is directed to a method for stabilizing a composition comprising a thermoplastic resin, up to about 10 weight percent carbon black, and up to about 50 weight percent glass against oxidative degradation comprising adding to said composition a stabilizing amount of:

(A) a first stabilizer comprising at least one N,N'-substituted oxamide antioxidant and/or at least one secondary amine antioxidant selected from the group consisting of:
  (1) a hydrocarbon-substituted diarylamine,
  (2) a reaction product of a diarylamine and an aliphatic ketone,
  (3) an N,N'-hydrocarbon substituted para-phenylenediamine, and
  (4) a polymerized dihydroquinoline;
(B) a second stabilizer comprising at least one sterically hindered phenol antioxidant; and
(C) a third stabilizer comprising at least one thioether antioxidant.

DESCRIPTION OF THE PREFERRED EMBODIMENTS

The present invention is characterized by a polymeric material to which a stabilizing mixture comprising at least three components has been added. Polymeric materials afforded stabilization by the stabilizing mixtures of the present invention are from the group of thermoplastic resins, especially polyolefins, preferably polypropylene. Further included are such thermoplastic resins to which certain inorganic filler materials, e.g., glass, have been added, up to a level of about 50 percent of the total weight of the glass and resin.

A further preferred embodiment of the present invention includes the presence of carbon black in the polymer or glass filled polymer. The carbon black is useful, inter alia, for providing resistance to the effects of ultraviolet light.

The thermoplastic resins that can be stabilized against oxidative-degradation employing the ternary mixtures of the present invention include resins derived from ethylene including low density polyethylene (LDPE), linear low density polyethylene (LLDPE), medium density polyethylene (MDPE), high density polyethylene (HDPE), or other ethylene derived resins that have densities from 0.85 to 1.4 gm/cm$^3$; homopolymers derived from mono- and di-ethylenically unsaturated hydrocarbon monomers of $C_3$ and above, such as, polypropylene, polyisobutylene, polymethylbutene-1, polymethylpentene-1, polybutene-1, polyisobutylene, and the like; copolymers derived from two or more monomers, such as, ethylene-propylene copolymers having at least a majority of propylene, propylene-butene-1 copolymers, propylene-isobutylene copolymers, and the like, and blends thereof; polystyrenes; polyvinylhalides; and engineering thermoplastics, for example, polyamides, polyesters, polyphenyleneoxides, polyphenylenesulfides, polyacetals, aliphatic polyketone co or terpolymers, poly (ethersulfones), polycarbonates, liquid crystalline polymers, poly(etheretherketones), and poly(arylates). It is preferred that the thermoplastic resin that is protected by the stabilizing blends of the present invention be a polyolefin resin and most preferred that it be polypropylene.

As stated above, one of the components in the stabilizing blend incorporated in the thermoplastic resin, whether or not it contains glass and/or carbon black, is a sterically hindered phenol. Another component is a secondary amine and/or an N,N,-substituted oxamide. Still another component is selected from the group consisting of thioethers. These blends of sterically hindered phenols, oxamides/secondary amines, and thioethers have unexpectedly been found to protect thermoplastic resins, e.g., polypropylene, optionally in the presence of carbon black and/or glass, from polymer breakdown, as evidenced by oven aging testing, weight loss measurement, and extended oxidative induction time.

The stabilizing composition of the present invention is useful for stabilizing thermoplastic resins, but it is especially useful for stabilizing thermoplastic resins containing carbon black. This is particularly advantageous because it is known in the art that many stabilizers that are useful for protecting resins that contain no carbon black lose their usefulness when carbon black is added. This phenomenon has been reported by Hawkins, W. L. in *Polymer Degradation and Stabilization,* Springer-Verlag, New York (1984). See especially page 56, where it is stated:

Antagonism between antioxidants would be expected if interactions occur which would destroy or reduce the effectiveness of either component. Hawkins and coworkers . . . observed an antagonistic effect when carbon black, used to protect against outdoor weathering, was combined with secondary amines or certain hindered phenols . . . .

Carbon black is a weak thermal antioxidant for polyethylene at 140° C., inhibiting oxidation for only about 20 h when used alone. The amine, on the other hand, provides effective protection for over 450 h. When the two are used in combination, however, the polymer is protected for only about 100 h. Carbon black also reacts antagonistically with many hindered phenols.

Absorption of amines or phenols onto the carbon black surface has been suggested as an explanation for the antagonistic effect. However, the extent of the antagonism varies with the chemical structure of carbon blacks, suggesting that catalytic destruction of the antioxidant at the surface may be the major factor responsible for antagonism. There are certain phenols which exhibit synergism with carbon black rather than antagonism.

It has further been found that the stabilizing three-component blend may be made up from two members from the group of secondary amines and/or N,N'-substituted oxamides and a member from the group of thioethers, provided that one of the secondary amines/oxamides employed also possesses hindered phenol functionality. Thus, in the practice of the present invention, there must be at least three separate components, i.e., there must be a component having secondary amine and/or N,N'-substituted oxamide functionality, there must be a component having hindered phenol functionality, and there must be a component having thioether functionality.

The sterically hindered phenols that are useful in the practice of the present invention are preferably selected from the group consisting of hindered phenols having a molecular weight above 500 Da. Preferred examples include 2,4-dimethyl-6-octyl-phenol; 2,6-di-t-butyl-4-methyl phenol (i.e., butylated hydroxy toluene); 2,6-di-t-butyl-4-ethyl phenol; 2,6-di-t-butyl-4-n-butyl phenol; 2,2'-methylenebis(4-methyl-6-t-butyl phenol); 2,2'-methylenebis(4-ethyl-6-t-butyl phenol); 2,4-dimethyl-6-t-butyl phenol; 4-hydroxymethyl-2,6-di-t-butyl phenol; n-octadecyl-beta(3,5-di-t-butyl-4-hydroxyphenol)propionate; 2,6-dioctadecyl-4-methyl phenol; 2,4,6-trimethyl phenol; 2,4,6-triisopropyl phenol; 2,4,6-tri-t-butyl phenol; 2-t-butyl-4,6-dimethyl phenol; 2,6-methyl-4-didodecyl phenol; tris(3,5-di-t-butyl-4-hydroxy isocyanurate, and tris(2-methyl-4-hydroxy-5-t-butylphenyl)butane.

More preferred are octadecyl-3,5-di-t-butyl-4-hydroxy hydrocinnamate (NAUGARD 76, Uniroyal Chemical; IRGANOX 1076, Ciba-Geigy); tetrakis{methylene(3,5-di-t-butyl-4-hydroxy-hydrocinnamate)}methane (NAUGARD 10, Uniroyal Chemical; IRGANOX 1010, Ciba-Geigy); 1,2-bis(3,5-di-t-butyl-4-hydroxyhydrocinnamoyl)hydrazine (IRGANOX MD 1024, Ciba-Geigy); 1,3,5-tris(3,5-di-t-butyl-4-hydroxybenzyl)-s-triazine-2,4,6(1H,3H,5H)trione (IRGANOX 3114, Ciba-Geigy); 1,3,5-tris(4-t-butyl-3-hydroxy-2,6-dimethylbenzyl)-s-triazine-2,4,6-(1H,3H,5H) trione (CYANOX 1790, American Cyanamide Co.); 1,3,5-trimethyl-2,4,6-tris(3,5-di-t-butyl-4-hydroxybenzyl) benzene (ETHANOX 330, Ethyl Corp.); 3,5-di-t-butyl-4-hydroxyhydrocinnamic acid triester with 1,3,5-tris(2-hydroxyethyl)-5-triazine-2,4,6(1H,3H,5H)-trione, and bis(3, 3-bis(4-hydroxy-3-t-butylphenyl)butanoic acid)glycolester.

Most preferred are the hindered phenols having molecular weights above 700, especially polyphenols that contain three or more substituted phenol groups, such as tetrakis{methylene (3,5-di-t-butyl-4-hydroxy-hydrocinnamate)}methane and 1,3,5-trimethyl-2,4,6-tris(3, 5-di-t-butyl-4-hydroxybenzyl)benzene.

The secondary amines that are useful in the practice of the present invention can be represented by the general formula

where $R^1$ and $R^2$ may be, but are not necessarily, identical. Thus, in a preferred embodiment, $R^1$ and $R^2$ can be independently selected from the group consisting of (i) aromatic carbon, (ii) aromatic carbon linked to a second nitrogen atom to give a phenylene diamine, and (iii) aliphatic $R^1$ with $R^2$ comprising a carbon atom linked to an oxygen atom, i.e., a carbonyl group.

Where $R^1$ is aliphatic, it can be straight chain or branched and can have from one to twelve carbon atoms, e.g., methyl, ethyl, propyl, butyl, pentyl, hexyl, heptyl, octyl, nonyl, decyl, undecyl, dodecyl, and isomers thereof. It is preferred that, where $R^1$ is aliphatic, it be a straight or branched chain aliphatic group having from one to eight carbon atoms, and more preferred that it have from one to four carbon atoms.

The amine antioxidants can be hydrocarbon substituted diarylamines, such as, aryl, alkyl, alkaryl, and aralkyl substituted diphenylamine antioxidant materials. A nonlimiting list of commercially available hydrocarbon substituted diphenylamines includes substituted octylated, nonylated, and heptylated diphenylamines and para-substituted styrenated or α-methyl styrenated diphenylamines. The sulfur-containing hydrocarbon substituted diphenylamines, such as p-(p-toluenesulfonylamide)diphenylamine, are also considered as part of this class.

Hydrocarbon-substituted diarylamines that are useful in the practice of this invention can be represented by the general formula

wherein Ar and Ar' are independently selected aryl radicals, at least one of which is preferably substituted with at least one alkyl radical. The aryl radicals can be, for example, phenyl, biphenyl, terphenyl, naphthyl, anthryl, phenanthryl, and the like. The alkyl substituent(s) can be, for example, methyl, ethyl, propyl, butyl, pentyl, hexyl, heptyl, octyl, nonyl, decyl, isomers thereof, and the like.

Preferred hydrocarbon-substituted diarylamines are those disclosed in U.S. Pat. Nos. 3,452,056 and 3,505,225, the disclosures of which are incorporated by reference herein. The preferred hydrocarbon-substituted diarylamines can be represented by the following general formulas:

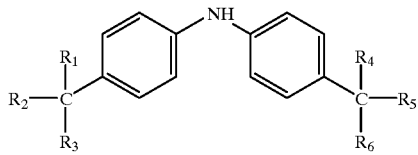

(I)

where $R_1$ is selected from the group consisting of phenyl and p-tolyl radicals;

$R_2$ and $R_3$ are independently selected from the group consisting of methyl, phenyl, and p-tolyl radicals;

$R_4$ is selected from the group consisting of methyl, phenyl, p-tolyl, and neopentyl radicals;

$R_5$ is selected from the group consisting of methyl, phenyl, p-tolyl, and 2-phenylisobutyl radicals; and, $R_6$ is a methyl radical.

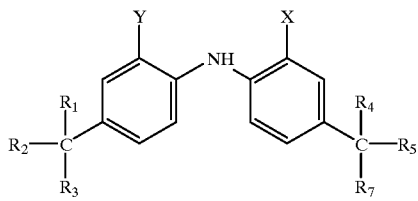

(II)

where $R_1$ through $R_5$ are independently selected from the radicals shown in Formula I and $R_7$ is selected from the group consisting of methyl, phenyl, and p-tolyl radicals;

X is a radical selected from the group consisting of methyl, ethyl, $C_3$–$C_{10}$ sec-alkyl, α,α-dimethylbenzyl, α-methylbenzyl, chlorine, bromine, carboxyl, and metal salts of the carboxylic acids where the metal is selected from the group consisting of zinc, cadmium, nickel, lead, tin, magnesium, and copper; and, Y is a radical selected from the group consisting of hydrogen, methyl, ethyl, $C_3$–$C_{10}$ sec-alkyl, chlorine, and bromine.

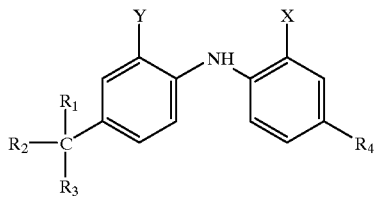

(III)

where $R_1$ is selected from the group consisting of phenyl or p-tolyl radicals;

$R_2$ and $R_3$ are independently selected from the group consisting of methyl, phenyl, and p-tolyl radicals;

$R_4$ is a radical selected from the group consisting of hydrogen, $C_3$–$C_{10}$ primary, secondary, and tertiary alkyl, and $C_3$–$C_{10}$ alkoxyl, which may be straight chain or branched; and X and Y are radicals selected from the group consisting of hydrogen, methyl, ethyl, $C_3$–$C_{10}$ sec-alkyl, chlorine, and bromine.

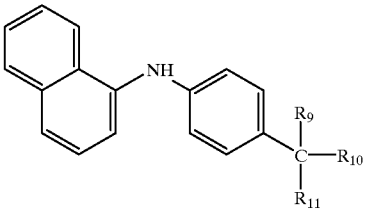

(IV)

where $R_9$ is selected from the group consisting of phenyl and p-tolyl radicals;

$R_{10}$ is a radical selected from the group consisting of methyl, phenyl, p-tolyl and 2-phenyl isobutyl; and $R_{11}$ is a radial selected from the group consisting of methyl, phenyl, and p-tolyl.

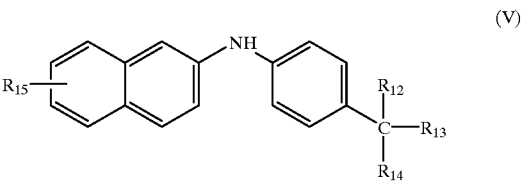

(V)

where $R_{12}$ is selected from the group consisting of phenyl or p-tolyl radicals;

$R_{13}$ is selected from the group consisting of methyl, phenyl, and p-tolyl radicals;

$R_{14}$ is selected from the group consisting of methyl, phenyl, p-tolyl, and 2-phenylisobutyl radicals; and $R_{15}$ is selected from the group consisting of hydrogen, α,α-dimethylbenzyl, α-methylbenzhydryl, triphenylmethyl, and α,α p-trimethylbenzyl radials.

Typical chemicals useful in the invention are as follows:

TYPE I

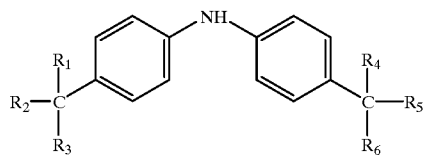

| R₁ | R₂ | R₃ | R₄ | R₅ | R₆ |
|---|---|---|---|---|---|
| Phenyl | Methyl | Methyl | Phenyl | Methyl | Methyl |
| Phenyl | Phenyl | Methyl | Phenyl | Phenyl | Methyl |
| Phenyl | Phenyl | Phenyl | Neopentyl | Methyl | Methyl |
| p-Tolyl | Methyl | Methyl | p-Tolyl | Methyl | Methyl |

TYPE II

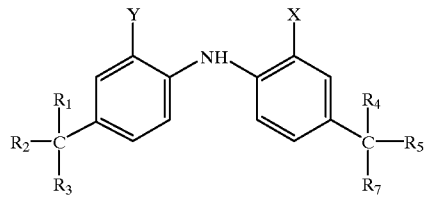

| R₁ | R₂ | R₃ | R₄ | R₅ | R₇ | X | Y |
|---|---|---|---|---|---|---|---|
| Phenyl | Methyl | Methyl | Phenyl | Methyl | Methyl | α,α-Dimethyl-benzyl | Hydrogen |
| Phenyl | Methyl | Methyl | Phenyl | Methyl | Methyl | Bromo | Bromo |
| Phenyl | Methyl | Methyl | Phenyl | Methyl | Methyl | Carboxyl | Hydrogen |
| Phenyl | Methyl | Methyl | Phenyl | Methyl | Methyl | Nickel carboxylate | Hydrogen |
| Phenyl | Methyl | Methyl | Phenyl | Methyl | Methyl | 2-Butyl | Hydrogen |
| Phenyl | Methyl | Methyl | Phenyl | Methyl | Methyl | 2-Octyl | Hydrogen |
| Phenyl | Phenyl | Phenyl | Phenyl | Phenyl | Phenyl | 2-Hexyl | Hydrogen |

TYPE III

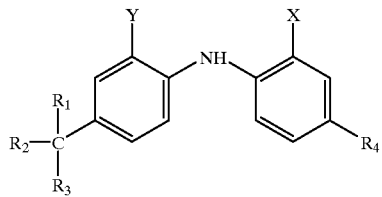

| R₁ | R₂ | R₃ | R₄ | X | Y |
|---|---|---|---|---|---|
| Phenyl | Methyl | Methyl | Isopropoxy | Hydrogen | Hydrogen |
| Phenyl | Methyl | Methyl | Hydrogen | 2-Octyl | Hydrogen |
| Phenyl | Phenyl | Phenyl | Hydrogen | 2-Hexyl | Hydrogen |

TYPE IV

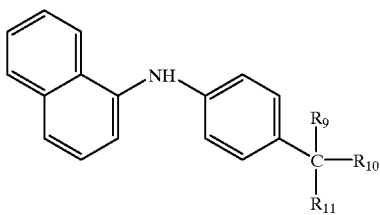

$R_9$ is phenyl and $R_{10}$ and $R_{11}$ are methyl.

Of the foregoing preferred hydrocarbon-substituted diarylamines, the substituted diphenylamines of the formula:

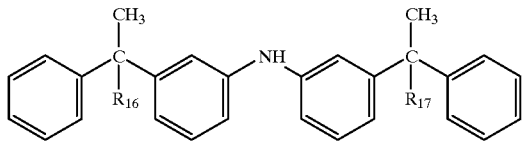

where $R_{16}$ and $R_{17}$ are methyl or phenyl are especially preferred. The compound wherein $R_{16}$ and $R_{17}$ are both methyl is 4,4'-bis(α,α-dimethylbenzyl)diphenylamine and the compound wherein $R_{16}$ and $R_{17}$ are both phenyl is 4,4'-bis(α-methylbenzyl)diphenylamine.

A second class of amine antioxidants comprises the reaction products of a diarylamine and an aliphatic ketone. The diarylamine aliphatic ketone reaction products that are useful herein are disclosed in U.S. Pat. Nos. 1,906,935; 1,975,167; 2,002,642; and 2,562,802. Briefly described, these products are obtained by reacting a diarylamine, preferably a diphenylamine, which may, if desired, possess one or more substituents on either aryl group, with an aliphatic ketone, preferably acetone, in the presence of a suitable catalyst. In addition to diphenylamine, other suitable diarylamine reactants include dinaphthyl amines; p-nitrodiphenylamine; 2,4-dinitrodiphenylamine; p-aminodiphenylamine; p-hydroxydiphenylamine; and the like. In addition to acetone, other useful ketone reactants include methylethylketone, diethylketone, monochloroacetone, dichloroacetone, and the like.

A preferred diarylamine-aliphatic ketone reaction product is obtained from the condensation reaction of diphenylamine and acetone (NAUGARD A, Uniroyal Chemical), for example, in accordance with the conditions described in U.S. Pat. No. 2,562,802. The commercial product is supplied as a light tan-green powder or as greenish brown flakes and has a melting range of 85° to 95° C.

A third class of suitable amines comprises the N,N' hydrocarbon substituted p-phenylene diamines. The hydrocarbon substituent may be alkyl or aryl groups, which can be substituted or unsubstituted. As used herein, the term "alkyl," unless specifically described otherwise, is intended to include cycloalkyl. Representative materials are:
N-phenyl-N'-cyclohexyl-p-phenylenediamine;
N-phenyl-N'-sec-butyl-p-phenylenediamine;
N-phenyl-N'-isopropyl-p-phenylenediamine;
N-phenyl-N'-'-(1,3-dimethylbutyl)-p-phenylenediamine;
N,N'-bis-(1,4-dimethylpentyl)-p-phenylenediamine;
N,N'-diphenyl-p-phenylenediamine;
N,N'-di-beta naphthyl-p-phenylenediamine; mixed diaryl-p-
N,N'-bis-(1-ethyl-3-methylpentyl)-p-phenylenediamines;
and
N,N'-bis-(1 methylheptyl)-p-phenylenediamine.

A fourth class of amine antioxidants comprises materials based on quinoline, especially, polymerized 1,2-dihydro-2,2,4-trimethylquinoline (Naugard Super Q, Uniroyal Chemical). Representative materials also include polymerized 2,2,4-trimethyl-1,2-dihydroquinoline; 6-dodecyl-2,2,4-trimethyl-1,2-dihydroquinoline; 6-ethoxy-2,2,4-trimethyl-1,2-dihydroquinoline, and the like.

Secondary amines that are especially preferred for use in the practice of the present invention are 4,4'-bis(ω,ω dimethyl)diphenylamine (Naugard 445, Uniroyal Chemical), octylated diphenylamine (Naugard Octamine, Uniroyal Chemical), and N-phenyl-N'-(p-toluenesulfonyl)-p-phenylene diamine (Naugard SA, Uniroyal Chemical).

As a alternative, or in addition, to the foregoing secondary amines, material based upon an N,N'-substituted oxamide, preferably possessing hindered phenol functionality, can be used. An especially preferred member of this class is 2,2'-oxamido-bis{ethyl-3-(3,5-di-t-butyl-4-hydroxyphenyl)}propionate (Naugard XL-1, Uniroyal Chemical).

Thioethers that are useful in the practice of the present invention can be of the structure:

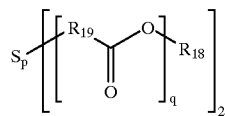

where p is 1 or 2, q is 0 or 1, and p+q=2, $R_{18}$ is a straight or branched chain alkyl moiety of 1 to 20 carbon atoms, and $R_{19}$ is a straight or branched chain alkylene moiety of 1 to 8 carbon atoms. Thus, $R_{18}$ can, for example, be methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomers thereof; and $R_{19}$ can, for example, be methylene, ethylene, propylene, butylene, pentylene, hexylene, heptylene, octylene, and isomers thereof. It is preferred that $R_{18}$ be a straight or branched chain alkyl moiety of 8 to 18 carbon atoms and that $R_{19}$ be a straight or branched chain alkylene moiety of 1 to 4 carbon atoms. It is more preferred that $R_{19}$ be ethylene, i.e., —$CH_2$—$CH_2$—.

Other thioethers that are useful in the practice of the present invention can be of the structure:

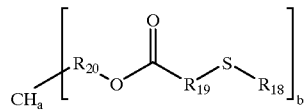

where a is 0 to 3, b is 1 to 4, and a+b=4, $R_{18}$ is as described above, and $R_{19}$ and $R_{20}$ are independently selected straight or branched chain alkylene moieties of 1 to 8 carbon atoms. It is preferred that $R_{19}$ and $R_{20}$ be independently selected straight or branched chain alkylene moieties of 1 to 4 carbon atoms. It is more preferred that $R_{20}$ be methylene, i.e., —$CH_2$—, and that $R_{19}$ be ethylene, i.e., —$CH_2$—$CH_2$—.

Preferred thioethers that are useful in the practice of the present invention are exemplified by products such as distearylthiodipropionate (Mark DSTDP, Witco Corp.), dilaurylthiodipropionate (Mark DLTDP, Witco Corp.), pentaerythritol tetrakis(β-laurylthiopropionate) (Seenox 412S, Witco Corp.), and pentaerythritol octylthiopropionate (Mark 2140, Witco Corp.).

The combined amounts of the amine/oxamide derivative (s), hindered phenol(s), and thioether(s) incorporated into the thermoplastic resins of the present invention, which may contain glass and/or carbon black, will at a minimum be that required to impart a significant level of stability against oxidative degradation. In general, such amounts can vary from about 0.01 to about 10.0 weight percent, and preferably from about 0.5 to about 5 weight percent, of the thermoplastic resin blend. Although combined amounts of the antioxidants in excess of about 10 weight percent can be employed, such amounts may have a deleterious effect on the physical and mechanical properties of the polymeric substrate, in which case they should be avoided ordinarily.

The relative proportions of hindered phenol to secondary amine/N,N'-substituted oxamide to thioether can vary widely. In general, the ratios of hindered phenol to secondary amine/oxamide can vary from about 20:1 to 1:20 and, preferably, from about 10:1 to about 1:10. Likewise, the ratios of secondary amine/oxamide to thioether can vary from about 20:1 to about 1:20 and, preferably, from about 10:1 to about 1:10. Ratios somewhat above and below the broader of these ranges can also be used with advantageous results.

As described above, it is possible to employ an antioxidant in the practice of the present invention that has both secondary amine/oxamide and hindered phenol functionality. Where this is done, such a difunctional antioxidant can take the place of either the secondary amine/antioxidant of the invention or the hindered phenol of the invention, but not both. Thus, the proportions described in the preceding paragraph will still apply.

Glass can be present in the thermoplastic resin employed in the practice of the present invention in an amount of up to about 50 percent by weight of the thermoplastic resin. Preferably, when glass is present, it will be in an amount ranging from about 5 to about 50 percent by weight, more preferably from about 20 to about 40 percent by weight.

Carbon black can be, and preferably is, present in the thermoplastic resin in an amount up to about 10 percent by weight of the thermoplastic resin. It is preferably present in an amount ranging from about 0.01 to about 10 percent by weight and, more preferably, in an amount ranging from about 0.1 to about 5 percent by weight.

The procedures employed to incorporate the amine/oxamide derivative(s), the hindered phenol(s), and the thioether(s) into the thermoplastic resins are not critical and, in general, follow any of the known procedures for incorporating additives into such resins. For example, these materials can be introduced into the thermoplastic resin as a premix or they can be maintained separately and added to the resin simultaneously or sequentially and then homogeneously distributed throughout the polymer by milling, extrusion blending, or some other mechanical working procedure. Either the first, the second, or the third stabilizer, or two of the foregoing, or all three can be added to the thermoplastic resin by way of a preconcentrate or in a carrier system, for example, in a suitable solvent or cosolvent.

Following common practice, other additives can be introduced into the resin prior to, during, and/or following addition of the antioxidants. Such additives include other stabilizers, colorants, reinforcements, fillers, antistatic agents, lubricants, plasticizers, and the like, present in the customary amounts.

Various features and aspects of the present invention are illustrated further in the examples that follow. While these examples are presented to show one skilled in the art how to operate within the scope of the invention, they are not intended in any way to serve as a limitation upon the scope of the invention.

OXIDATIVE INDUCTION TIMES

Circular discs are cut from 0.25 mm films of the material to be tested and placed in aluminum pans for use in a Perkin-Elmer DSC-2C type differential scanning calorimeter (DSC). The test chamber of the DSC calorimeter is purged with nitrogen during conditioning to an isocratic temperature of, for example, 200° C. followed by an immediate change to oxygen at a flow rate of 20 cc's per minute to induce thermaloxidative degradation. Oxidative Induction Time (OIT) is the time span in minutes between reaching the isocratic temperature when the oxygen environment is introduced and the time at which the DSC detects the onset of oxidation.

Thermogravimetric Analysis (TGA)

TGA was run on 20 mil polypropylene films using a TA-High Resolution TGA 2950 instrument. Samples were prepared by dieing out discs ⅛ inch in diameter. Samples were weighed and then heated to 230° C. under nitrogen. After equilibrating, gas flow was switched to air followed by an isothermal run at 230° C. for 120 minutes. All graphs were analyzed by TA software for the point in time when 2 percent weight loss relative to weight before heating occurred.

Molding of Polypropylene Films

Dryblends were made from Profax 6501 (Montel) polypropylene. All formulations contained 0.1 percent calcium stearate (Witco Corp). For carbon black-containing materials Printex-60 (Degussa) was used. After adding stabilizers relative to polypropylene in the amounts as indicated under Examples, the resultant dryblends were mixed at 185° C. in a Brabender C.E.O-6 type measuring head at 15 r.p.m. for 15 minutes. The resultant product was then used to compression mold 6×6" films at 380° F. for four minutes. Films of 10 mil thickness were used for OIT measurement while 20 mil test specimens were typically subjected to long term heat aging, TGA, and weight loss testing.

Glass Mat Reinforced Polypropylene 20 mil polypropylene films were made from a Fina 3882 (MFI=100) material with the additives as stated under Examples. All formulations contained 0.1 percent calcium stearate (Witco) and 0.9 percent Printex 60 (Degussa). An ecoMat® G-500 glass filament product (Schuller, Germany) was used to produce a sandwich by alternating two 6×3" polypropylene films with one needled glass mat of the same size to give a total of six layers. Two sandwiches were combined by putting them on top of each other. They were then compression molded at 380° F. for three minutes. After cooling, the resultant composite was placed in a circulating air over at 230° C. for 90 seconds. The glass-filled test specimen was used in subsequent weight loss testing at 150° C. and 230° C.

Long-term Heat Aging and Weight Loss Testing

Long-term heat aging (LTHA) and weight loss testing were done in circulating air ovens (Blue M) at the temperatures specified in the Examples. LTHA test specimens were inspected visually for failure at 24 hour intervals. For weight loss testing, test specimens were removed from the oven, cooled in a desiccator, and then weighed.

EXAMPLES 1–23

These examples illustrate long-term heat aging of 20 mil polypropylene films at 150° C. All formulations contained 0.9 percent carbon black and 0.1 percent stearate.

| Example | A (wt. %) | B (wt. %) | C (wt. %) | Oven aging at 150° C. (hours to failure) |
|---|---|---|---|---|
| 1 | Naugard 10 (0.1) | — | — | 96 |
| 2 | — | Naugard 445 (0.1) | — | 72 |

-continued

| Example | A (wt. %) | B (wt. %) | C (wt. %) | Oven aging at 150° C. (hours to failure) |
|---|---|---|---|---|
| 3 | — | Naugard 445 (0.2) | — | 96 |
| 4 | — | — | DSTDP (0.5) | 96 |
| 5 | Naugard 10 (0.1) | Naugard 445 (0.1) | — | 192 |
| 6 | Naugard 10 (0.1) | Naugard 445 (0.1) | DSTDP (0.3) | 678 |
| 7 | Naugard 10 (0.1) | Naugard 445 (0.1) | Seenox 412S (0.3) | 846 |
| 8 | Naugard 10 (0.1) | Naugard 445 (0.1) | DSTDP (0.6) | 840 |
| 9 | Naugard 10 (0.1) | Naugard 445 (0.3) | DSTDP (0.6) | 984 |
| 10 | Naugard 10 (0.1) | Naugard 445 (0.3) | DLTDP (0.6) | 336 |
| 11 | Naugard 10 (0.1) | Naugard XL-1 (0.1) | — | 510 |
| 12 | Naugard 10 (0.1) | Naugard XL-1 (0.1) | DSTDP (0.3) | 846 |
| 13 | Naugard 10 (0.1) | Naugard XL-1 (0.1) | DSTDP (0.6) | 984 |
| 14 | Naugard 10 (0.1) | Naugard XL-1 (0.1) | DLTDP (0.6) | 624 |
| 15 | Naugard 10 (0.1) | Naugard XL-1 (0.2) | DSTDP (0.6) | 1368 |
| 16 | Naugard 10 (0.1) | Naugard XL-1 (0.2) | Seenox 412S (0.6) | 1128 |
| 17 | Naugard 10 (0.1) | Octamine (0.1) | — | 270 |
| 18 | Naugard 10 (0.1) | Octamine (0.1) | DSTDP (0.3) | 702 |
| 19 | Naugard 10 (0.1) | Naugard SA (0.1) | — | 270 |
| 20 | Naugard 10 (0.1) | Naugard SA (0.1) | DSTDP (0.3) | 654 |
| 21 | Naugard 10 (0.1) | Super Q (0.2) | — | 216 |
| 22 | Naugard 10 (0.1) | Super Q (0.2) | DSTDP (0.3) | 440 |
| 23 | Naugard 445 (0.1) | Naugard XL-1 (0.1) | DSTDP (0.6) | 840 |

EXAMPLES 24–36

These examples illustrate OIT values of 10 mil polypropylene films at 200° C. All formulations contained 0.9 percent carbon black and 0.1 percent calcium stearate.

| Example | A (wt. %) | B (wt. %) | C (wt. %) | OIT values at 200° C. (min). |
|---|---|---|---|---|
| 24 | Naugard 10 (0.1) | — | — | 15 |
| 25 | — | Naugard 445 (0.1) | — | 6 |
| 26 | — | Naugard 445 (0.2) | — | 6 |
| 27 | Naugard 10 (0.1) | Naugard 445 (0.1) | — | 45 |
| 28 | Naugard 10 (0.1) | Naugard 445 (0.1) | DSTDP (0.3) | 164 |
| 29 | Naugard 10 (0.1) | Naugard 445 (0.1) | Seenox 412S (0.3) | 411 |
| 30 | Naugard 10 (0.1) | Naugard 445 (0.1) | DSTDP (0.6) | 331 |
| 31 | Naugard 10 (0.1) | Naugard 445 (0.3) | DSTDP (0.6) | 513 |
| 32 | Naugard 10 (0.1) | Octamine (0.1) | — | 51 |
| 33 | Naugard 10 (0.1) | Octamine (0.1) | DSTDP (0.3) | 163 |
| 34 | Naugard 10 (0.1) | Naugard SA (0.1) | — | 33 |
| 35 | Naugard 10 (0.1) | Naugard SA (0.1) | DSTDP (0.3) | 67 |
| 36 | Naugard 445 (0.1) | Naugard XL-1 (0.2) | Seenox 412S (0.6) | >700 |

EXAMPLES 37–41

These examples illustrate weight loss of 20 mil polypropylene films with time at 150° C. All formulations contained 0.9 percent carbon black and 0.1 percent calcium stearate.

| Example | A (wt. %) | B (wt. %) | C (wt. %) | Wt. Loss (%) @ 34 days |
|---|---|---|---|---|
| 37 | Naugard 10 (0.1) | Naugard 445 (0.1) | DSTDP (0.6) | 0.77 |
| 38 | Naugard 10 (0.1) | Naugard 445 (0.3) | DSTDP (0.6) | 0.88 |
| 39 | Naugard 10 (0.1) | Naugard 445 (0.3) | Seenox 412S (0.6) | 0.46 |
| 40 | Naugard 10 (0.1) | Naugard XL-1 (0.2) | DSTDP (0.6) | 0.47 |
| 41 | Naugard 445 (0.1) | Naugard XL-1 (0.2) | Seenox 412S (0.6) | 0.61 |

EXAMPLES 42–61

These examples illustrate thermogravimetric analysis of 20 mil polypropylene films at 230° C. All formations contained 0.9 percent carbon black and 0.1 percent calcium stearate.

| Example | A (wt. %) | B (wt. %) | C (wt. %) | Time (min.) to 2% wt. loss |
|---|---|---|---|---|
| 42 | Naugard 10 (0.1) | — | — | 8 |
| 43 | — | Naugard 445 (0.1) | — | 7 |
| 44 | — | Naugard 445 (0.2) | — | 12 |
| 45 | Naugard 10 (0.1) | Naugard 445 (0.1) | — | 21 |
| 46 | Naugard 10 (0.1) | Naugard 445 (0.1) | DSTDP (0.3) | 39 |
| 47 | Naugard 10 (0.1) | Naugard 445 (0.1) | Seenox 412S (0.3) | 57 |
| 48 | Naugard 10 (0.1) | Naugard 445 (0.1) | DSTDP (0.6) | 68 |
| 49 | Naugard 10 (0.1) | Naugard 445 (0.3) | DSTDP (0.6) | 98 |
| 50 | Naugard 10 (0.1) | Naugard 445 (0.3) | DLTDP (0.6) | 120 |
| 51 | Naugard 10 (0.1) | Naugard 445 (0.3) | Seenox 412S (0.6) | 120 |
| 52 | Naugard 10 (0.1) | Naugard XL-1 (0.1) | — | 9 |
| 53 | Naugard 10 (0.1) | Naugard XL-1 (0.1) | DSTDP (0.3) | 19 |

-continued

| Example | A (wt. %) | B (wt. %) | C (wt. %) | Time (min.) to 2% wt. loss |
|---|---|---|---|---|
| 54 | Naugard 10 (0.1) | Naugard XL-1 (0.1) | DSTDP (0.6) | 17 |
| 55 | Naugard 10 (0.1) | Naugard XL-1 (0.1) | DLTDP (0.6) | 19 |
| 56 | Naugard 10 (0.1) | Naugard XL-1 (0.2) | DSTDP (0.6) | 36 |
| 57 | Naugard 10 (0.1) | Octamine (0.1) | — | 17 |
| 58 | Naugard 10 (0.1) | Octamine (0.1) | DSTDP (0.3) | 19 |
| 59 | Naugard 10 (0.1) | Naugard SA (0.1) | — | 10 |
| 60 | Naugard 10 (0.1) | Naugard SA (0.1) | DSTDP (0.3) | 10 |
| 61 | Naugard 445 (0.1) | Naugard XL-1 (0.1) | DSTDP (0.6) | 47 |

EXAMPLES 62–65

Glass Mat Reinforced Polypropylene

These examples illustrate weight loss with time of polypropylene films reinforced with 30 percent (by weight) glass at 150° C. All formulations contained 0.9 percent carbon black and 0.1 percent calcium stearate (relative to polypropylene). Weight percentages for A, B, and C listed in Examples 62–65 are given relative to polypropylene.

| Example | A (wt. %) | B (wt. %) | C (wt. %) | Wt. loss (%) after 28 days at 150° C. |
|---|---|---|---|---|
| Control | Naugard 10 (0.1) | Naugard 524* (0.2) | DSTDP (0.6) | 10.4 |
| 62 | Naugard 10 (0.1) | Naugard 445 (0.1) | DSTDP (0.6) | 9.4 |
| 63 | Naugard 10 (0.1) | Naugard 445 (0.3) | DSTDP (0.6) | 2.5 |
| 64 | Naugard 445 (0.1) | Naugard XL-1 (0.2) | DSTDP (0.6) | 6.7 |
| 65 | Naugard 10 (0.1) | Naugard 445 (0.3) | Seenox 412S (0.6) | 3.5 |

* Tri(2,4-di-tert-butylphenyl)phosphite

EXAMPLES 66–70

Glass Mat Reinforced Polypropylene

These examples illustrate weight loss with time of polypropylene films reinforced with 30 percent (by weight) glass at 230° C. All formulations contained 0.9 percent carbon black and 0.1 percent calcium stearate (relative to polypropylene). Weight percentages for A, B, and C listed in Examples 66–70 are given relative to polypropylene.

| Example | A (wt. %) | B (wt. %) | C (wt. %) | Wt. loss (%) after 30 min. at 230° C. |
|---|---|---|---|---|
| Control | Naugard 10 (0.1) | Naugard 524* (0.2) | DSTDP (0.6) | 15.6 |
| 66 | Naugard 10 (0.1) | Naugard 445 (0.1) | DSTDP (0.6) | 0.30 |
| 67 | Naugard 10 (0.1) | Naugard 445 (0.3) | DSTDP (0.6) | 0.28 |
| 68 | Naugard 445 (0.1) | Naugard XL-1 (0.2) | DSTDP (0.6) | 0.28 |
| 69 | Naugard 10 (0.1) | Naugard XL-1 (0.2) | DSTDP (0.6) | 0.29 |
| 70 | Naugard 10 (0.1) | Naugard 445 (0.3) | Seenox 412S (0.6) | 0.27 |

*Tris(2,4-di-tert-butylphenyl)phosphite

EXAMPLES 71–72

These examples illustrate long-term heat aging of carbon black-free 10 mil polypropylene films at 150° C. All formulations contained 0.1 percent calcium stearate.

| Example | A (wt. %) | B (wt. %) | C (wt. %) | Oven aging at 150° C. (hours to failure) |
|---|---|---|---|---|
| 71 | Naugard 10 (0.1) | Naugard 445 (0.1) | DSTDP (0.6) | >1500 |
| 72 | Naugard 10 (0.1) | Naugard 445 (0.3) | DSTDP (0.6) | >2000 |

EXAMPLES 73–74

These examples illustrate OIT values of carbon black-free 10 mil polypropylene films at 200° C. All formulations contained 0.1 percent calcium stearate.

| Example | A (wt. %) | B (wt. %) | C (wt. %) | OIT at 200° C. (min) |
|---|---|---|---|---|
| 73 | Naugard 10 (0.1) | Naugard 445 (0.1) | DSTDP (0.6) | 494 |
| 74 | Naugard 10 (0.1) | Naugard 445 (0.3) | DSTDP (0.6) | 309 |

With regard to the foregoing examples, it is seen that the addition of 0.3 percent DSTDP to a blend of Naugard 10 and Naugard 445 (Examples 5 and 6) resulted in a 3.5-fold increase in oven aging from 192 to 678 hours. Moreover, with Seenox 412S, as illustrated in Example 7, a 4.5-fold improvement to 846 hours was recorded. Similar synergistic and unexpected results were observed for Naugard Octamine and Naugard SA, as Evidenced by Examples 17 through 20.

Addition of 0.3 percent thioether to a blend of Naugard 10 and Super Q showed only a corresponding twofold improvement—to 440 hours—of oven aging, as measured by time to failure. Thus, the quinoline type secondary amine identified as Naugard Super Q in Examples 21 and 22, although within the scope of the present invention, is not preferred because it did not significantly improve oven aging, as measured by time (in hours) to failure. On the other hand, Examples 21 and 22 do further illustrate the unexpected and synergistic results obtained by the addition of a thioether to a blend of hindered phenols and secondary amines.

Example 23 serves to illustrate the stabilizing effect of a three component blend consisting of one member having both N,N'-substituted oxamido functionality and phenol functionality, a second member having secondary amine functionality, and a third member from the group of thioethers. Further, in testing on glass, it is seen that when the blends comprising Naugard 445 or Naugard XL-1 as secondary amine component or N,N'-substituted oxamido component, respectively, Naugard 10 as hindered phenol component, and DSTDP or Seenox 412S as thioether component (Examples 62–65) were tested for weight loss at 150° C., they consistently gave much better protection to the GMT test specimen than the control, as measured by weight loss. For example, while the control afforded 10.4 percent weight loss, a blend of Naugard 445, Naugard 10, and DSTDP (Example 64) showed only 2.5 percent weight loss.

Finally, in testing on glass for weight loss at 230° C., it is seen that blends of secondary amines/N,N'-substituted oxamides, hindered phenols, and thioethers not only met the requirement of the GMT industry for less than two percent weight loss after 15 minutes exposure at 230° C., but also consistently outperformed the control (Examples 66 through 70).

In view of the many changes and modifications that can be made without departing from principles underlying the invention, reference should be made to the appended claims for an understanding of the scope of the protection afforded the invention.

What is claimed is:

1. A method for stabilizing a composition comprising
   A) carbon black;
   B) a thermoplastic resin selected from the group consisting of polyethylene, polypropylene, polyisobutylene, polymethylbutene-1, polymethylpentene-1, polybutene-1, polyisobutylene, ethylene-propylene copolymers having a majority of propylene, propylene-butene-1 copolymers, propylene-isobutylene copolymers, polystyrenes, polyvinylhalides, polyamides, polyesters, polyphenyleneoxides, polyphenylenesulfides, polyacetals, aliphatic polyketone co or terpolymers, poly(ethersulfones), polycarbonates, liquid crystalline polymers, poly (etheretherketones), and poly(arylates); and
   C) up to about 50 weight percent glass; against oxidative degradation comprising adding to said composition a stabilizing amount of:
   D) a first stabilizer comprising at least one antioxidant selected from the group consisting of
      1) N,N'-substituted oxamide antioxidants;
      2) secondary amine antioxidants selected from the group consisting of:
         a) a hydrocarbon-substituted diarylamine,
         b) a reaction product of a diarylamine and an aliphatic ketone,
         c) an N,N'-hydrocarbon substituted para-phenylenediamine, and
         d) a polymerized dihydroquinoline; and
      3) mixtures of 1) and 2);
   E) a second stabilizer comprising at least one sterically hindered phenol antioxidant selected from the group consisting of:
      1,2-bis(3,5-di-t-butyl-4-hydroxyhydrocinnamoyl) hydrazine;
      1,3,5-trimethyl-2,4,6-tris(3,5-di-t-butyl-4-hydroxybenzyl)benzene;
      1,3,5-tris(3,5-di-t-butyl-4-hydroxybenzyl)-s-triazine-2,4,6 (1H,3H,5H)trione;
      1,3,5-tris(4-t-butyl-3-hydroxy-2,6-dimethylbenzyl)-s-triazine-2,4,6-(1H,3H,5H)trione;
      2-t-butyl-4,6-dimethyl phenol;
      2,2'-methylenebis(4-ethyl-6-t-butyl-phenol);
      2,2'-methylenebis(4-methyl-6-t-butyl phenol);
      2,4-dimethyl-6-octyl-phenyl;
      2,4-dimethyl-6-t-butyl phenol;
      2,4,6-tri-t-butyl phenol;
      2,4,6-triisopropyl phenol;
      2,4,6-trimethyl phenol;
      2,6-di-t-butyl-4-ethyl phenol;
      2,6-di-t-butyl-4-methyl phenol;
      2,6-di-t-butyl-4-n-butyl phenol;
      2,6-dioctadecyl-4-methyl phenol;
      2,6methyl-4-didodecyl phenol;
      3,5-di-t-butyl-4-hydroxyhydrocinnamic acid triester with 1,3,5-tris(2-hydroxyethyl)-5-triazine-2,4,6 (1H,3H,5H)-trione; bis(3,3-bis(4-hydroxy-3-t-butylphenyl)butanoic acid)glycolester;
      4-hydroxymethyl-2,6-di-t-butyl phenol;
      tetrakis{methylene(3,5-di-t-butyl-4-hydroxyhydrocinnamate)}methane;
      and 1,3,5-trimethyl-2,4,6-tris(3,5-di-t-butyl-4-hydroxybenzyl)benzene.; and
   F) a third stabilizer comprising at least one thioether antioxidant having a structure selected from the group consisting of:

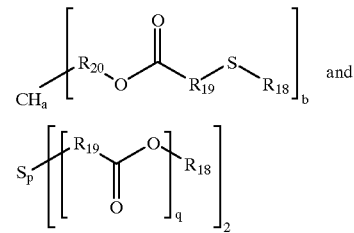

where p is 1 or 2, q is 0 or 1, p+q=2, a is 0 to 3, b is 1 to 4, a+b=4, $R_{18}$ is a straight or branched chain alkyl moiety of from 1 to 20 carbon atoms, and $R_{19}$ and $R_{20}$ are independently selected straight or branched chain alkylene moieties of from 1 to 8 carbon atoms.

2. The method of claim 1 wherein the first stabilizer is 4,4'-bis(ω,ω dimethyl)diphenylamine.

3. The method of claim 1 wherein the first stabilizer is a hydrocarbon-substituted diarylamine.

4. The method of claim 3 wherein the hydrocarbon-substituted diarylamine is 4,4'-bis(α,α-dimethylbenzyl) diphenylamine.

5. The method of claim 3 wherein the hydrocarbon-substituted diarylamine is 4,4'-bis(α-methylbenzyl) diphenylamine.

6. The method of claim 1 wherein the first stabilizer is a reaction product of a diarylamine and an aliphatic ketone.

7. The method of claim 6 wherein the diarylamine is diphenylamine.

8. The method of claim 6 wherein the ketone is acetone.

9. The method of claim 1 wherein the first stabilizer is an N,N'-hydrocarbon-substituted para-phenylene diamine.

10. The method of claim 9 wherein the N,N'-hydrocarbon-substituted para-phenylene diamine is selected from the group consisting of N-phenyl-N'-cyclohexyl-p-phenylenediamine; N-phenyl-N'-sec-butyl-p-phenylenediamine; N-phenyl-N'-isopropyl-p-phenylenediamine; N-phenyl-N'-(1,3-dimethylbutyl)-p- phenylenediamine; N,N'-diphenyl-p-phenylenediamine; N,N'-bis-(1,4-dimethylpentyl)-p-phenylenediamine; N,N'-di-beta naphthyl-p-phenylenediamine; mixed diaryl-p-N,N'-bis-(1-ethyl-3-methylpentyl)-p-phenylenediamines; and N,N'-bis-(1 methylheptyl)-p-phenylenediamine.

11. The method of claim 1 wherein the first stabilizer is a polymerized dihydroquinoline.

12. The method of claim 11 wherein the polymerized dihydroquinoline is selected from the group consisting of polymerized 2,2,4-trimethyl-1,2-dihydroquinoline; 6-dodecyl-2,2,4-trimethyl-1,2-dihydroquinoline; and 6-ethoxy-2,2,4-trimethyl-1-2-dihydroquinoline.

13. The method of claim 1 wherein the first stabilizer is an N,N'-substituted oxamide.

14. The method of claim 13 wherein the N,N'-substituted oxamide is 2,2'-oxamido-bis{ethyl-3-(3,5-di-t-butyl-4-hydroxyphenyl)}propionate.

15. The method of claim 1 wherein the sterically hindered phenol has a molecular weight above 500 daltons.

16. The method of claim 15 wherein the sterically hindered phenol has a molecular weight above 700 daltons.

17. The method of claim 1 wherein the sterically hindered phenol is tetrakis{methylene(3,5-di-t-butyl-4-hydroxyhydrocinnamate)}methane.

18. The method of claim 1 wherein the sterically hindered phenol is 1,3,5-trimethyl-2,4,6-tris(3,5-di-t-butyl-4-hydroxybenzyl)benzene.

19. The method of claim 1 wherein the thioether is distearylthiodipropionate.

20. The method of claim 1 wherein the thioether is dilaurylthiodipropionate.

21. The method of claim 1 wherein the thioether is pentaerythritol tetrakis($\beta$-laurylthiopropionate).

22. The method of claim 1 wherein the thioether is pentaerythritol octylthiopropionate.

* * * * *